(12) United States Patent
Zhang et al.

(10) Patent No.: US 11,387,965 B2
(45) Date of Patent: Jul. 12, 2022

(54) METHOD FOR REPLYING WITH ACKNOWLEDGEMENT FRAME, APPARATUS, AND DATA TRANSMISSION SYSTEM

(71) Applicant: HUAWEI TECHNOLOGIES CO., LTD., Guangdong (CN)

(72) Inventors: Li Zhang, Wuhan (CN); Xiaoyue He, Shenzhen (CN); Shengsen Wang, Wuhan (CN); Weixi Chen, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 93 days.

(21) Appl. No.: 16/822,379

(22) Filed: Mar. 18, 2020

(65) Prior Publication Data
US 2020/0304269 A1    Sep. 24, 2020

(30) Foreign Application Priority Data
Mar. 19, 2019    (CN) .......................... 201910209883.X

(51) Int. Cl.
*H04W 72/12* (2009.01)
*H04L 5/00* (2006.01)
*H04W 84/12* (2009.01)

(52) U.S. Cl.
CPC ....... *H04L 5/0055* (2013.01); *H04W 72/1268* (2013.01); *H04W 72/1289* (2013.01); *H04W 84/12* (2013.01)

(58) Field of Classification Search
CPC ............ H04L 5/0055; H04W 72/1268; H04W 72/1289; H04W 84/12
See application file for complete search history.

(56) References Cited

U.S. PATENT DOCUMENTS

2011/0305176 A1    12/2011 Wentink
2015/0117427 A1*    4/2015 Park .................. H04W 28/0263
                                                                                370/338
(Continued)

FOREIGN PATENT DOCUMENTS

CN        105684335 A        6/2016
CN        109417755 A        3/2019
(Continued)

OTHER PUBLICATIONS

Extended European Search Report issued in EP Application No. 20164324.4 dated Jul. 31, 2020, total 10 pages.

(Continued)

*Primary Examiner* — Brian P Cox

(57) ABSTRACT

A method for replying with an acknowledgement frame includes: calculating, by an access point (AP), sending duration of a physical layer service data unit (PSDU) in a to-be-sent downlink physical layer protocol data unit (downlink PPDU) based on a format and a sending rate that are of the downlink PPDU and based on only that a length of each block acknowledgement bitmap field in a block acknowledgement frame in the downlink PPDU is a maximum quantity of bytes that is of each respective block acknowledgement bitmap field of the plurality of stations (STAs), to generate an legacy signal field of a second preamble; and generating, by the AP, the block acknowledgement frame, where each STA information subfield in a block acknowledgement information field of the block acknowledgement frame includes an association identifier traffic identifier field, a block acknowledgement starting sequence control field, and a block acknowledgement bitmap field.

18 Claims, 5 Drawing Sheets

(56) References Cited

U.S. PATENT DOCUMENTS

| | | | |
|---|---|---|---|
| 2016/0029373 A1 | 1/2016 | Seok | |
| 2017/0171878 A1 * | 6/2017 | Chun | ................... H04B 7/0404 |
| 2017/0331736 A1 | 11/2017 | Seok | |
| 2018/0324638 A1 * | 11/2018 | Chu | ..................... H04L 1/1614 |

FOREIGN PATENT DOCUMENTS

| | | | |
|---|---|---|---|
| CN | 109417817 A | 3/2019 | |
| EP | 3565365 A1 * | 11/2019 | .......... H04W 72/048 |
| EP | 3565365 A1 | 11/2019 | |
| WO | 2018124725 A1 | 7/2018 | |
| WO | WO-2018124725 A1 * | 7/2018 | ........ H04W 72/0446 |

OTHER PUBLICATIONS

IEEE P802.11ax/D4.0, Feb. 2019 Part 11: Wireless LAN Medium Access Control (MAC) and Physical Layer (PHY) Specifications, Amendment 1: Enhancements for High Efficiency WLAN, total 746 pages.

HTC, UE radio access capability for WLAN. 3GPP TSG-RAN2#91bis meeting, Malmo, Sweden, Oct. 5, 9, 2015, R2-154369, 7 pages.

Chinese Office Action dated Mar. 9, 2021 for Application No. 201910209883.X, 9 pages.

Japanese Official Notice of Rejection for Application No. 2020-047908 dated Jul. 6, 2021, 9 pages.

\* cited by examiner

| frame control | duration | RA | TA | BA control | BA information | FCS |

METHOD FOR REPLYING WITH ACKNOWLEDGEMENT FRAME, APPARATUS, AND DATA TRANSMISSION SYSTEM

CROSS-REFERENCE TO RELATED APPLICATION

This application claims priority to Chinese Patent Application No. 201910209883.X, filed on Mar. 19, 2019, which is hereby incorporated by reference in its entirety.

TECHNICAL FIELD

This application relates to the field of wireless local area network (WLAN) technologies, and in particular, to replying with an acknowledgement frame.

BACKGROUND

In a WLAN, after successfully receiving a media access control protocol data unit (MAC protocol data unit or MPDU, which may also be referred to as a MAC frame) sent by a transmit end device, a receive end device needs to reply to the transmit end device with an acknowledgement (ACK) frame in a short interframe space (SIFS), that is, the total duration from receiving the MAC frame by the receive end device to sending the ACK frame by the receive end device needs to be less than the SIFS. The process includes the duration of parsing the MAC frame by the receive end device and the duration of generating the ACK frame by the receive end device. Both the MAC frame and the ACK frame are located in a data field of a physical layer protocol data unit (PPDU). The PPDU also includes a preamble that is located before the data field.

With development of WLAN technologies, to improve performance of a WLAN system, algorithms used for data transmission have increasingly high complexity (for example, using an increasingly large forward error correction (FEC) code word). Correspondingly, the duration consumed for parsing the MAC frame by the receive end device is increasingly long. In addition, a future WLAN system may use a distributed architecture to separate a WLAN baseband from a radio frequency and connect the WLAN baseband and the radio frequency by using a wired medium. The distributed architecture also introduces an additional processing delay. Consequently, the receive end device may not be capable of replying with the ACK frame in the SIFS.

SUMMARY

This application provides a method for replying with an acknowledgement frame, an apparatus, and a data transmission system. Example technical solutions are as follows.

According to a first aspect, a method for replying with an acknowledgement frame is provided. The method includes: sending, by an access point (AP) in a WLAN, a scheduling frame to a plurality of stations (STAs) associated with the AP in the WLAN; receiving, by the AP, a plurality of uplink PPDUs that are in response to the scheduling frame, where each of the plurality of uplink PPDUs includes a first preamble and an A-MPDU; calculating, by the AP, sending duration of a physical layer service data unit (PSDU) in a to-be-sent downlink PPDU based on a format and a sending rate that are of the downlink PPDU and based on only that a length of each block acknowledgement bitmap field in a block acknowledgement frame in the downlink PPDU is a maximum quantity of bytes that is of each respective block acknowledgement bitmap field of the plurality of STAs and that is determined by the AP and the plurality of STAs in a session association phase, to generate a legacy signal (L-SIG) field of a second preamble, where the downlink PPDU includes the second preamble and the PSDU, and the PSDU is the block acknowledgement frame for aggregated MPDUs (A-MPDUs) in all the uplink PPDUs; generating, by the AP, the block acknowledgement frame, where the block acknowledgement frame includes a block acknowledgement information field, the block acknowledgement information field includes a plurality of STA information subfields, the plurality of STA information subfields have a one-to-one correspondence with the plurality of STAs, each STA information subfield includes an AID TID field, a block acknowledgement starting sequence control field, and a block acknowledgement bitmap field, and a length of the block acknowledgement bitmap field in each STA information subfield is equal to a maximum quantity of bytes of a block acknowledgement bitmap field that is determined by the AP and a corresponding STA in the session association phase; and sending, by the AP, the downlink PPDU.

The format and the sending rate that are of the to-be-sent downlink PPDU are both predetermined by the AP, and the length of each block acknowledgement bitmap field in the block acknowledgement frame in the downlink PPDU is always equal to the maximum quantity of bytes that is of each respective block acknowledgement bitmap field of the plurality of STAs and that is determined by the AP and the plurality of STAs in the session association phase, in other words, the length of each block acknowledgement bitmap field in the block acknowledgement frame is fixed, so that a total length of the block acknowledgement frame is fixed and is unrelated to whether the AP successfully receives an MPDU in the A-MPDU. Therefore, the AP may calculate the sending duration of the PSDU in the downlink PPDU before receiving the A-MPDU, to generate the L-SIG field of the second preamble. In addition, another field in the second preamble may be generated based on the first preamble and the scheduling frame, and is also unrelated to the received A-MPDU. Therefore, the AP may generate the second preamble of the downlink PPDU before receiving the A-MPDU, to reduce a delay of replying to the STA with the block acknowledgement frame.

Optionally, the L-SIG field includes a length subfield, and the calculating sending duration of a PSDU in a downlink PPDU, to generate an L-SIG field of a second preamble includes: determining, by the AP, the total length of the block acknowledgement frame based on a length of the association identifier traffic identifier (AID TID) field, a length of the block acknowledgement starting sequence control field, the maximum quantity of bytes of the block acknowledgement bitmap field that is determined by the AP and the plurality of STAs in the session association phase, and a total length of all other fields in the block acknowledgement frame, where the length of the AID TID field is two octets, the length of the block acknowledgement starting sequence control field is two octets, and the total length of all the other fields in the block acknowledgement frame is equal to 22 octets; and determining, by the AP, a value of the length subfield based on the total length of the block acknowledgement frame and the sending rate.

Optionally, the AID TID field includes an AID subfield, an acknowledgement frame type subfield, and a TID subfield; and a value of the acknowledgement frame type subfield is always 0, and a value range of the TID subfield is from 0 to 7.

Optionally, the AID TID field includes the AID subfield, the acknowledgement frame type subfield, and the TID subfield, and the generating, by the AP, the block acknowledgement frame includes: when the entire A-MPDU in any uplink PPDU is not successfully received, setting, by the AP, a field value of an AID subfield in a STA information subfield corresponding to the PPDU that is in the block acknowledgement frame and in which the entire A-MPDU is not successfully received to a specified AID value, where the specified AID value is different from AID values corresponding to all the STAs associated with the AP.

Optionally, the maximum quantity of bytes of the block acknowledgement bitmap field is one of 4 bytes, 8 bytes, 16 bytes, and 32 bytes.

According to a second aspect, a method for sending a data frame is provided. The method includes: receiving, by a STA, a scheduling frame; sending, by the STA, an uplink PPDU to an AP in response to the scheduling frame, where the uplink PPDU includes a first preamble and an A-MPDU; receiving, by the STA, a downlink PPDU sent by the AP, where an L-SIG field of a second preamble in the downlink PPDU is generated by sending duration of a PSDU in the downlink PPDU that is calculated by the AP based on a format and a sending rate that are of the downlink PPDU and based on only that a length of each block acknowledgement bitmap field in a block acknowledgement frame in the downlink PPDU is a maximum quantity of bytes that is of each respective block acknowledgement bitmap field of the plurality of STAs and that is determined by the AP and a plurality of associated STAs in a session association phase, where the PSDU is the block acknowledgement frame for A-MPDUs in all the uplink PPDUs; and parsing, by the STA, the downlink PPDU.

The format and the sending rate that are of the downlink PPDU are both predetermined by the AP, and the length of each block acknowledgement bitmap field in the block acknowledgement frame in the downlink PPDU is always equal to the maximum quantity of bytes that is of each respective block acknowledgement bitmap field of the plurality of STAs and that is determined by the AP and the plurality of STAs in the session association phase, in other words, the length of each block acknowledgement bitmap field in the block acknowledgement frame is fixed, so that a total length of the block acknowledgement frame is fixed and is unrelated to whether the AP successfully receives the A-MPDU. Therefore, the AP may calculate the sending duration of the PSDU in the downlink PPDU before receiving the A-MPDU, to generate the L-SIG field of the second preamble. In addition, another field in the second preamble may be generated based on the first preamble and the scheduling frame, and is also unrelated to the received A-MPDU. Therefore, the AP may generate the second preamble of the downlink PPDU before receiving the A-MPDU, to reduce a delay of replying to the STA with the block acknowledgement frame.

According to a third aspect, an AP in a WLAN is provided. The AP has a function of implementing behavior in the method for replying with an acknowledgement frame according to the first aspect. The AP includes at least one module, and the at least one module is configured to implement the method for replying with an acknowledgement frame provided in the first aspect.

According to a fourth aspect, a STA in a WLAN is provided. The STA has a function of implementing behavior in the method for sending a data frame according to the second aspect. The STA includes at least one module, and the at least one module is configured to implement the method for sending a data frame provided in the second aspect.

According to a fifth aspect, a data transmission system is provided. The data transmission system includes an AP and a plurality of STAs associated with the AP, the AP is the AP according to the third aspect, and the STA is the STA according to the fourth aspect.

According to a sixth aspect, an AP in a WLAN is provided. The AP includes a processor and a communications interface, where the processor is configured to perform the method for replying with an acknowledgement frame provided in the first aspect, and the processor is further configured to exchange information with an associated STA by using the communications interface.

According to a seventh aspect, a STA in a WLAN is provided. The STA includes a processor and a communications interface, where the processor is configured to perform the method for sending a data frame provided in the second aspect, and the processor is further configured to exchange information with an associated AP by using the communications interface.

According to an eighth aspect, a computer-readable storage medium is provided. The computer-readable storage medium stores an instruction, and when the instruction is run on a computer, the computer is enabled to perform the method for replying with an acknowledgement frame according to the first aspect.

According to a ninth aspect, a computer-readable storage medium is provided. The computer-readable storage medium stores an instruction, and when the instruction is run on a computer, the computer is enabled to perform the method for sending a data frame according to the second aspect.

According to a tenth aspect, a computer program product including an instruction is provided. When the computer program product is run on a computer, the computer is enabled to perform the method for replying with an acknowledgement frame according to the first aspect.

According to an eleventh aspect, a computer program product including an instruction is provided. When the computer program product is run on a computer, the computer is enabled to perform the method for sending a data frame according to the second aspect.

Technical effects achieved in the third aspect, the sixth aspect, the eighth aspect, and the tenth aspect are similar to technical effects achieved by a corresponding technical means in the first aspect.

Technical effects achieved in the fourth aspect, the seventh aspect, the ninth aspect, and the eleventh aspect are similar to technical effects achieved by a corresponding technical means in the second aspect.

DESCRIPTION OF EMBODIMENTS

To make the objectives, technical solutions, and advantages of this application clearer, the following further describes the implementations of this application in detail with reference to the accompanying drawings.

Network devices in a WLAN contend for a channel by using a backoff mechanism, and after a network device obtains the channel through contention, the network device may transmit a PPDU on the channel. A data field of the PPDU is used to carry a MAC frame. The MAC frame includes data, control signaling, management signaling, or the like. Content carried in the data field is a physical layer valid payload, which may be referred to as a physical layer service data unit (PSDU).

Because stability when transmitting data through the channel is relatively poor, a message confirmation mechanism is used in a current WLAN. An implementation of the message acknowledgement mechanism includes: If a receive end device successfully receives a MAC frame sent by a transmit end device, the receive end device replies to the transmit end device with an ACK frame. If a receive end device does not successfully receive a MAC frame sent by a transmit end device, the receive end device does not reply to the transmit end device with an ACK frame. If a transmit end device does not receive, within a specified time period after sending a MAC frame, an ACK frame with which a receive end device replies for the MAC frame, the transmit end device determines that the MAC frame is not successfully transmitted. To prevent the receive end device from contending for a channel after successfully receiving the MAC frame sent by the transmit end device, the receive end device needs to reply to the transmit end device with the ACK frame within an SIFS after receiving the MAC frame.

To improve WLAN performance, currently, a frame aggregation technology is used at a MAC layer to aggregate a plurality of MPDUs into one aggregated MPDU (A-MPDU). Because all MPDUs in a same A-MPDU are transmitted by using one PPDU, overheads of a PPDU preamble and overheads for contending a channel can be reduced, and transmission efficiency can be improved. Correspondingly, the receive end device acknowledges receiving of the A-MPDU by using a block acknowledgement (Block ACK or BA) frame.

Figures 1, 2:
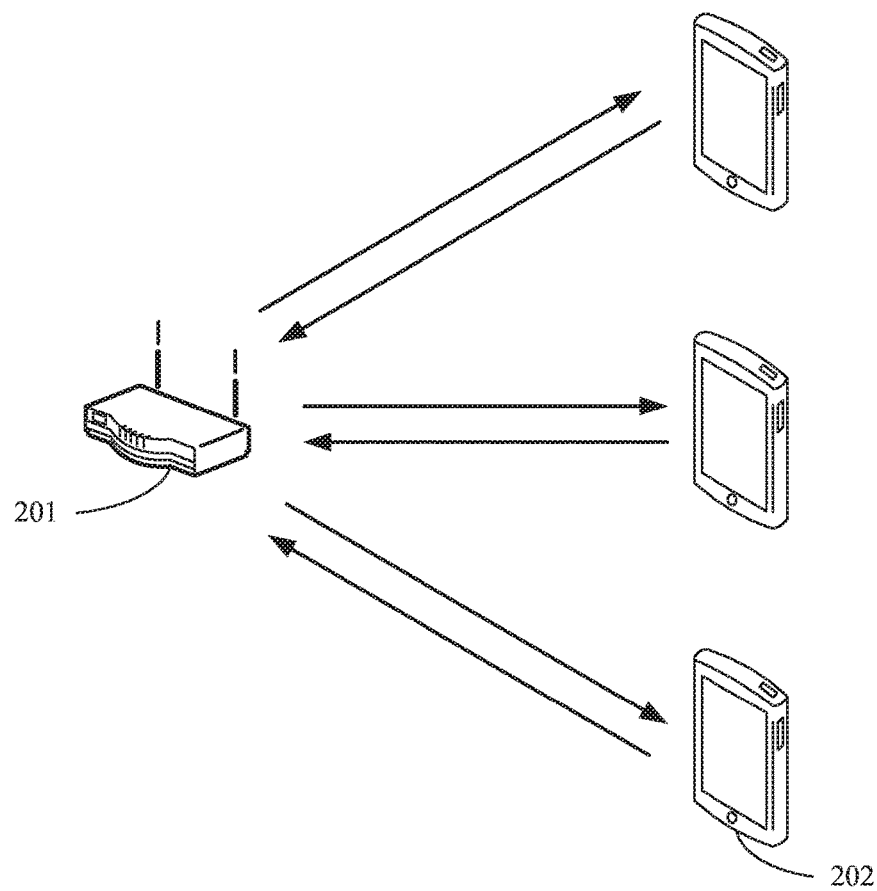
FIG. 1 is a schematic diagram of a frame structure of a block acknowledgement frame according to an embodiment of this application.
FIG. 2 is a schematic structural diagram of a data transmission system according to an embodiment of this application.

FIG. 1 is a schematic diagram of a frame structure of a block acknowledgement frame in an Institute of Electrical and Electronics Engineers (IEEE) 802.11ax protocol draft. As shown in FIG. 1, the block acknowledgement frame includes a frame control field, a duration field, a receiver address (RA) field, a transmitter address (TA) field, a block acknowledgement control (BA control) field, a block acknowledgement information (BA information) field, a frame check sequence (FCS) field, and the like. The frame control field and the frame length (duration) field belong to a frame header (MAC header). The block acknowledgement control field includes a block acknowledgement type (BA type) subfield, and when the block acknowledgement type subfield is set to 11, the block acknowledgement frame is a multi-STA block acknowledgement (multi-STA Block ACK) frame.

In the IEEE 802.11ax protocol draft, a length of the frame control field is two octets (octets), a length of the frame length field is two octets, a length of the RA field is six octets, a length of the TA field is six octets, a length of the block acknowledgement control field is two octets, a length of the block acknowledgement information field is variable, and a length of the frame check sequence field is four octets.

The length of the block acknowledgement information field is related to whether the receive end device successfully receives each A-MPDU subframe in the A-MPDU. For example, when the block acknowledgement frame is a multi-STA block acknowledgement frame, according to the IEEE 802.11ax protocol draft, when the receive end device successfully receives some A-MPDU subframes in the A-MPDU, the block acknowledgement information field generated by the receive end device for the A-MPDU includes an association identifier traffic identifier (AID TID) field, a block acknowledgement starting sequence control (Block ACK starting sequence control) field, and a block acknowledgement bitmap (Block ACK bitmap) field. When the receive end device successfully receives all A-MPDU subframes in the A-MPDU, the block acknowledgement information field generated by the receive end device for the A-MPDU includes only the AID TID field, in other words, neither the block acknowledgement starting sequence control field nor the block acknowledgement bitmap field exists. A length of the AID TID field is always two octets. The block acknowledgement starting sequence control field and the block acknowledgement bitmap field that are in the block acknowledgement information field always exist at the same time or both do not exist. When the block acknowledgement starting sequence control field exists, a length of the block acknowledgement starting sequence control field is always two octets.

Because the length of the block acknowledgement information field in the block acknowledgement frame is variable, the receive end device can determine a total length of the block acknowledgement frame only after completing receiving of the entire A-MPDU. The receive end device then generates a legacy signal (L-SIG) field in a preamble of the PPDU based on the total length of the block acknowledgement frame. Therefore, according to the IEEE 802.11ax protocol draft, the receive end device cannot generate, before completing receiving of the entire A-MPDU, the preamble of the PPDU that carries the block acknowledgement frame, so that a delay of generating the PPDU is relatively long.

FIG. 2 is a schematic structural diagram of a data transmission system according to an embodiment of this application. The data transmission system is a WLAN system. As shown in FIG. 2, the data transmission system includes an access point (AP) 201 and a plurality of stations (STA) 202 associated with the AP 201. That the plurality of STAs 202 are associated with the AP 201 means that each of the plurality of STAs 202 is connected to the AP 201 in a wireless manner, that is, each STA 202 can perform wireless communication with the AP 201. The AP 201 is configured to provide a WLAN protocol-based wireless access service for the connected STA 202. Data transmitted by the AP 201 to the STA 202 is referred to as downlink transmission data, and data transmitted by the STA 202 to the AP 201 is referred to as uplink transmission data.

Optionally, the AP may be a network device supporting the WLAN such as a base station, a router, or a switch, and the STA may be a mobile phone, a computer, or the like that supports the WLAN. In addition, whereas only three STAs are used as an example for description in FIG. 2, this does not constitute a limitation to a quantity of STAs in the data transmission system provided in embodiments of this application.

Figure 3:
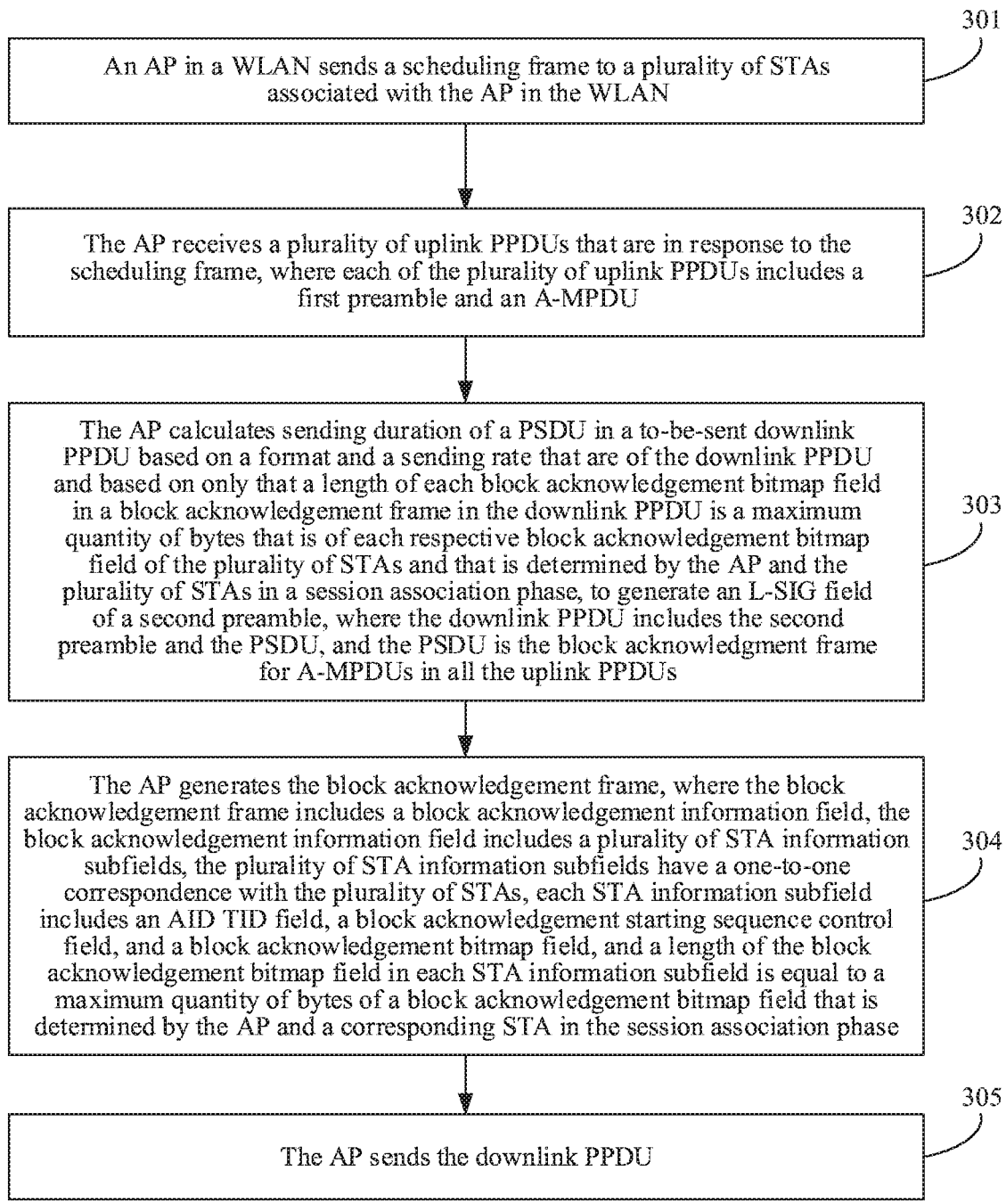
FIG. 3 is a flowchart of a method for replying with an acknowledgement frame according to an embodiment of this application.

FIG. 3 is a flowchart of a method for replying with an acknowledgement frame according to an embodiment of this application. The method is applied to the data transmission system shown in FIG. 2. As shown in FIG. 3, the method includes the following steps.

In step 301, an AP in a WLAN sends a scheduling frame to a plurality of STAs associated with the AP in the WLAN.

The scheduling frame carries a quantity of spatial streams of each of the plurality of STAs associated with the AP, and the scheduling frame is used to instruct each STA that receives the scheduling frame to send an uplink PPDU by using the corresponding quantity of spatial streams, a corresponding modulation and coding scheme (MCS) value, and a corresponding resource block.

In the IEEE 802.11ax protocol draft, a trigger frame is a frame that allocates a resource for transmitting a PPDU, and the trigger frame may further include other information required by the STA to send the PPDU. Therefore, in this embodiment of this application, the AP may use the trigger frame in the IEEE 802.11ax protocol draft as the scheduling frame, to indicate a quantity of spatial streams that is used by each of the plurality of STAs when the STA sends the uplink PPDU. In an example implementation, the scheduling frame may be a buffer status report poll (BSRP) trigger frame in the IEEE 802.11ax protocol draft. The scheduling frame may alternatively be another type of trigger frame in the IEEE 802.11ax protocol draft. This is not limited in embodiments of this application.

Figure 4:
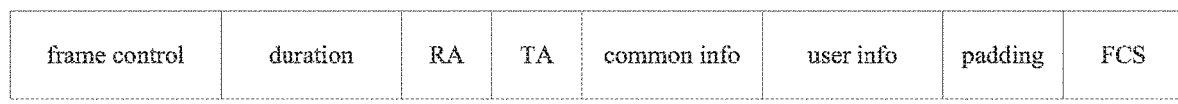
FIG. 4 is a schematic diagram of a frame structure of a trigger frame according to an embodiment of this application.

FIG. 4 is a schematic diagram of a frame structure of a trigger frame in the IEEE 802.11ax protocol draft. As shown in FIG. 4, the trigger frame includes a frame control field, a frame length field (shown as "duration"), an RA field, a TA field, a common information (common info) field, a user information (user info) field, a padding field, an FCS field, and the like.

The user information field is used to configure a resource of a user that needs to be scheduled. In the IEEE 802.11ax protocol draft, the user information field may include: a field used to indicate a length of an uplink sent PPDU (UL length), a field used to indicate a maximum bandwidth supported by a STA in uplink (UL BW field), and fields used to indicate resource block related information (RU Allocation) and spatial stream allocation (SS allocation) that are used when a scheduled STA sends a PPDU in uplink. Therefore, in this embodiment of this application, the spatial stream allocation field in the trigger frame in the IEEE 802.11ax protocol draft may be used to carry the quantity of spatial streams of each of the plurality of STAs associated with the AP.

In this embodiment of this application, to schedule the plurality of STAs, the spatial stream allocation field may be divided into a plurality of spatial stream quantity (number of spatial streams) fields. Each spatial stream quantity field is used to set a quantity of spatial streams of a STA. N spatial stream quantity fields may be sequentially marked as an Nss_STA 1, an Nss_STA 2, . . . , and an Nss_STA N, and N is an integer greater than 1. For example, when N is 2, that Nss_STA 1=2 and Nss_STA 2=2 may indicate that a quantity of spatial streams of the first to-be-scheduled STA is set to 2, and a quantity of spatial streams of the second to-be-scheduled STA is set to 2.

In addition, in this embodiment of this application, the AP is associated with the plurality of STAs. Therefore, for ease of implementation of scheduling, the AP may perform group scheduling on the plurality of STAs. In addition, for ease of implementation of scheduling, during the group scheduling, the AP may schedule the STAs that support a same maximum WLAN transmission bandwidth together. The scheduling frame carries a plurality of quantities of spatial streams, and the plurality of quantities of spatial streams respectively correspond to the plurality of STAs.

To implement the foregoing group scheduling, before the AP performs the scheduling, the AP groups the plurality of STAs associated with the AP, and any group in a grouping result includes only STAs that support a same maximum WLAN transmission bandwidth. In this case, the plurality of STAs corresponding to the plurality of quantities of spatial streams that are carried in the scheduling frame belong to a single group in the grouping result.

In an example implementation, the AP first groups the plurality of associated STAs based on a maximum WLAN transmission bandwidth supported by each STA, to obtain a plurality of STA sets. Each STA set includes at least one STA, and each STA set corresponds to one bandwidth. In this case, each STA set may be directly used as a group.

In another example implementation, after the plurality of STA sets are obtained, for any STA set in the plurality of STA sets, if the STA set includes one STA, the STA set is directly used as a group. If the STA set includes at least two STAs, a maximum quantity of spatial streams of each STA of the at least two STAs is determined, and then, STAs that are in the STA set and of which a sum of maximum quantities of spatial streams is less than or equal to a theoretical maximum quantity of spatial streams of the AP are divided as a group.

For example, the theoretical maximum quantity of spatial streams of the AP is 10, and a STA set includes five STAs, respectively marked as a STA 1, a STA 2, a STA 3, a STA 4, and a STA 5. A maximum quantity of spatial streams of the STA 1 is 6, a maximum quantity of spatial streams of the STA 2 is 2, a maximum quantity of spatial streams of the STA 3 is 3, a maximum quantity of spatial streams of the STA 4 is 4, and a maximum quantity of spatial streams of the STA 5 is 5. In this case, the STA 1 and the STA 4 may be used as a group, and the STA 2, the STA 3, and the STA 5 may be used as another group.

In addition, after the AP sends the scheduling frame, each STA currently accessing the AP may receive the scheduling frame. For any STA that accesses the AP, when receiving the scheduling frame, the STA determines, based on user information carried in the scheduling frame, whether the STA needs to respond to the scheduling frame. If the STA determined that scheduling frame needs to be responded to, information required for sending the uplink PPDU, including the quantity of spatial streams that is used when the PPDU is sent, is obtained from the scheduling frame. Then, an uplink data frame is sent based on the quantity of spatial streams. If it is determined that the scheduling frame does not need to be responded to, the scheduling frame is ignored.

In step 302, the AP receives a plurality of uplink PPDUs that are in response to the scheduling frame, and each of the plurality of uplink PPDUs includes a first preamble and an A-MPDU.

The A-MPDU includes at least one A-MPDU subframe. Each A-MPDU subframe includes an MPDU delimiter and an MPDU. Optionally, the A-MPDU subframe may further include a padding field located after the MPDU. The MPDU delimiter is used to separate a plurality of aggregated MPDUs.

After the AP sends the scheduling frame, when any STA of the plurality of STAs receives the scheduling frame, if there is no data that needs to be transmitted currently, the STA does not send the uplink PPDU. In addition, even if the STA sends the uplink PPDU to the AP, due to reasons such as a network environment, the AP may not receive, within a specified time, the uplink PPDU sent by the STA. Therefore, in this embodiment of this application, after the AP sends the scheduling frame, the AP attempts to receive, within the specified time, each uplink PPDU sent in response to the scheduling frame.

Figure 5:
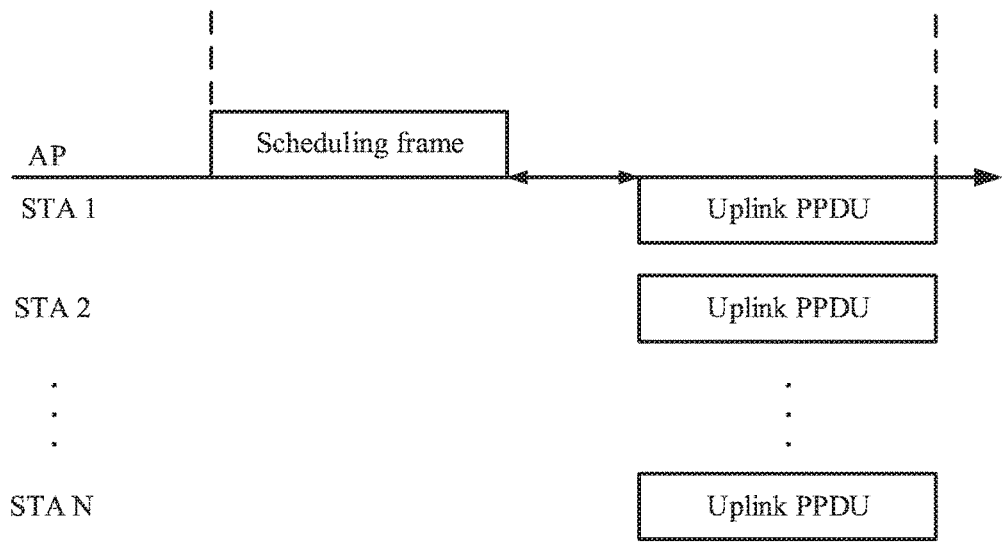
FIG. 5 is a schematic diagram of a frame sending sequence according to an embodiment of this application.

FIG. 5 is a schematic diagram of a frame sending sequence according to an embodiment of this application. As shown in FIG. 5, in one example at least one STA is a STA 1 to a STAN. After an AP sends a scheduling frame, each STA of the STA 1 to the STA N sends an uplink PPDU to the AP. The AP attempts to receive the uplink PPDUs sent by the STA 1 to the STA N.

In step 303, the AP calculates sending duration of a PSDU in a to-be-sent downlink PPDU based on a format and a sending rate that are of the downlink PPDU and based on only that a length of each block acknowledgement bitmap field in a block acknowledgement frame in the downlink PPDU is a maximum quantity of bytes that is of each respective block acknowledgement bitmap field of the plurality of STAs and that is determined by the AP and the plurality of STAs in a session association phase, to generate an L-SIG field of a second preamble. The downlink PPDU includes the second preamble and the PSDU, and the PSDU is the block acknowledgement frame for A-MPDUs in all the uplink PPDUs.

The format and the sending rate that are of the to-be-sent downlink PPDU are both predetermined by the AP, and the length of each block acknowledgement bitmap field in the block acknowledgement frame in the downlink PPDU is always equal to the maximum quantity of bytes that is of each respective block acknowledgement bitmap field of the plurality of STAs and that is determined by the AP and the plurality of STAs in the session association phase. In other words, the length of each block acknowledgement bitmap field in the block acknowledgement frame in the downlink PPDU is always fixed, so that a total length of the block acknowledgement frame is fixed and is unrelated to whether the AP successfully receives the A-MPDU in the uplink PPDU. Therefore, the AP may calculate the sending duration of the PSDU in the downlink PPDU before receiving the A-MPDU, to generate the L-SIG field of the second preamble. In addition, another field in the second preamble may be generated based on the first preamble and the scheduling frame, and is also unrelated to the received A-MPDU. Therefore, the AP may generate the second preamble of the downlink PPDU before receiving the A-MPDU, to reduce a delay of replying to the STA with the block acknowledgement frame.

Optionally, the maximum quantity of bytes of the block acknowledgement bitmap field is one of 4 bytes, 8 bytes, 16 bytes, and 32 bytes. Maximum quantities of bytes of block acknowledgement bitmap fields that are determined by different STAs and the AP in the session association phase may be the same or may be different.

Figure 6:
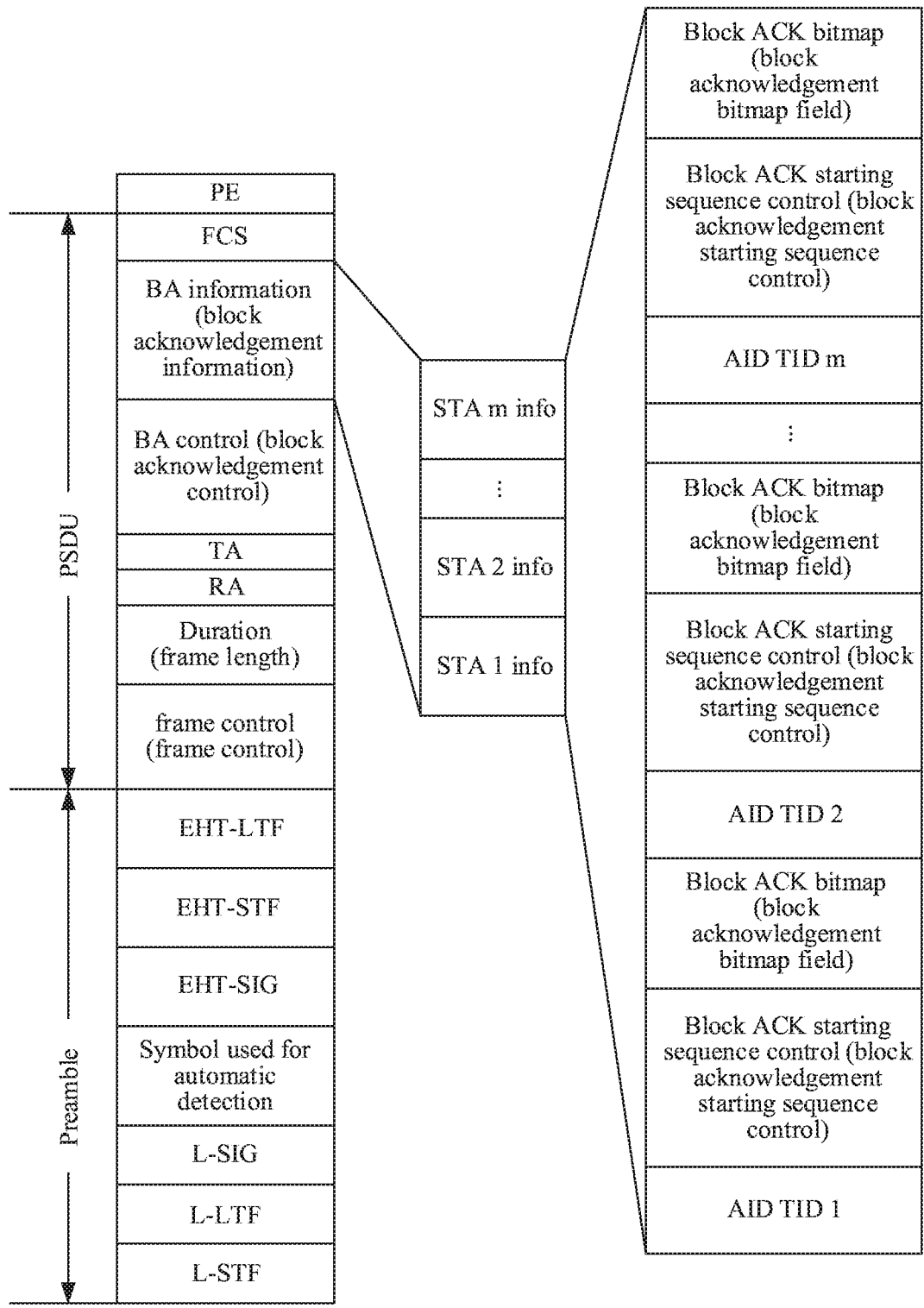
FIG. 6 is a schematic structural diagram of a downlink PPDU according to an embodiment of this application.

FIG. 6 is a schematic structural diagram of a downlink PPDU according to an embodiment of this application. As shown in FIG. 6, the downlink PPDU includes a preamble and a PSDU. The preamble includes a legacy short training field (L-STF), a legacy long training field (L-LTF), an L-SIG field, a symbol used for automatic detection, an extremely high throughput signaling (EHT-SIG) field, an extremely high throughput short training field (EHT-STF), and an extremely high throughput long training field (EHT-LTF), and the preamble is used to assist in receiving the PSDU. The L-SIG field includes a length subfield and a rate subfield, and a transmit end indirectly indicates transmission duration of the PPDU by using the length subfield and the rate subfield in the L-SIG field. The PSDU is a block acknowledgement frame for A-MPDUs in all the uplink PPDUs. For explanations of fields in the PSDU, refer to explanations of fields in the block acknowledgement frame shown in FIG. 1. Optionally, referring to FIG. 6, the downlink PPDU may further include a data packet extension (PE) field located after the PSDU.

Still referring to FIG. 6, the PSDU is the block acknowledgement frame for A-MPDUs in all the uplink PPDUs, a block acknowledgement information field in the block acknowledgement frame includes m STA information subfields (STA 1 info to STA m info). The m STA information subfields have a one-to-one correspondence with m uplink PPDUs received by an AP, and each STA information subfield includes an AID TID field, a block acknowledgement starting sequence control field, and a block acknowledgement bitmap field. m is an integer greater than 1.

Optionally, the downlink PPDU may be one of a non-high throughput (Non-HT) PPDU, a non-high throughput duplicate (Non-HT duplicate) PPDU, a high throughput (HT) PPDU, a very high throughput (VHT) PPDU, a high efficiency single user (HE SU) PPDU, a high efficiency extended range single user (HE ER SU) PPDU, or an orthogonal frequency division multiple access high efficiency multi-user (OFDMA HE MU) PPDU. A format of the downlink PPDU is not limited in example embodiments.

The sending rate of the downlink PPDU is configured by using an MCS value, a used quantity of spatial streams, and a transmit channel bandwidth.

Optionally, a process of calculating the sending duration of the PSDU in the downlink PPDU to generate the L-SIG field of the second preamble includes:

S1. The AP determines the total length of the block acknowledgement frame based on a length of the AID TID field, a length of the block acknowledgement starting sequence control field, a maximum quantity of bytes of the block acknowledgement bitmap field that is determined by the AP and the plurality of STAs in the session association phase, and a total length of all other fields in the block acknowledgement frame.

The length of the AID TID field is two octets, the length of the block acknowledgement starting sequence control field is two octets, and the total length of all the other fields in the block acknowledgement frame is equal to 22 octets.

S2. The AP determines a value of the length subfield based on the total length of the block acknowledgement frame and the sending rate.

The value of the length subfield is used to indicate a length of a PSDU in a current PPDU. Optionally, a formula for calculating a Length of the length subfield is as follows:

$$\text{Length} = \left\lceil \frac{TXTIME - SignalExtension - 20}{4} \right\rceil \times 3 - 3 - m.$$

SignalExtension (signal extension) is a parameter related to a transmission frequency band. When the AP works in 2.4

GHz, the parameter is 6 μs (microseconds). When the AP works in 5 GHz, the parameter is 0 μs. TXTIME is transmission duration of the entire downlink PPDU. A value of m may be 0, 1, or 2, depending on a specific PPDU type. ⌈ ⌉ represents rounding up.

For example, in this embodiment of this application, a process of calculating the value of the length subfield in the L-SIG field is described by using an example in which the downlink PPDU is a non-HT PPDU and the AP works in 5 GHz. A formula for calculating a Length of the length subfield in the L-SIG field is as follows:

$$\text{Length} = \left\lceil \frac{TXTIME - 20}{4} \right\rceil \times 3 - 3.$$

TXTIME=20+$N_{SYM}T_{SYM}$, 20 indicates that duration used to transmit the preamble is equal to 20 μs, $N_{SYM}$ indicates a quantity of OFDM symbols used to transmit the PSDU, and $T_{SYM}$ indicates transmission duration of each OFDM symbol and may be $T_{SYM}$=4 μs. A formula for calculating the $N_{SYM}$ is as follows:

$$N_{SYM} = \left\lceil \frac{16 + 8 \times \text{LENGTH} + 6}{N_{DBPS}} \right\rceil.$$

$N_{DBPS}$ indicates a quantity of valid bits that can be transmitted by each OFDM symbol, and the quantity of effective bits depends on a selected MCS index value and a channel bandwidth. LENGTH is the total length of the block acknowledgement frame. In the non-HT PPDU, a service field in a preamble adjacent to the PSDU and a tail field located after the PSDU are transmitted together with the PSDU. A length of the service field is 16 bits, and a length of the tail field is 6 bits.

For example, when the MCS index value is 0, binary phase shift keying (BPSK) modulation and binary convolution codes (BCC) are used for signal modulation, and a transmission bit rate is ½; it is assumed that the quantity of spatial streams is 1, and the transmit channel bandwidth of the downlink PPDU is 20 MHz (megahertz), and then 48 data subcarriers are used to transmit a signal. Therefore, $N_{DBPS}$=48*0.5=24. In addition, it is assumed that the scheduling frame schedules five STAs, and maximum quantities of bytes of the block acknowledgement bitmap field that are determined by the five STAs and the AP in the session association phase are respectively eight octets, four octets, eight octets, 16 octets, and eight octets, so that a total length of the block acknowledgement information field is 64 octets. In addition, because the total length of all the other fields except the block acknowledgement information field in the block acknowledgement frame is 22 octets, the total length (LENGTH) of the block acknowledgement frame is 86 octets. And that $N_{SYM}$=30, TXTIME=140, and Length=87 may be calculated. Correspondingly, content in the length subfield is 87, and is represented as 1010111 in binary mode.

In step 304, the AP generates the block acknowledgement frame. The block acknowledgement frame includes a block acknowledgement information field, the block acknowledgement information field includes a plurality of STA information subfields, the plurality of STA information subfields have a one-to-one correspondence with the plurality of STAs, each STA information subfield includes an AID TID field, a block acknowledgement starting sequence control field, and a block acknowledgement bitmap field, and a length of the block acknowledgement bitmap field in each STA information subfield is equal to a maximum quantity of bytes of a block acknowledgement bitmap field that is determined by the AP and a corresponding STA in the session association phase.

The AID TID field includes an AID subfield, an acknowledgement frame type (ACK type) subfield, and a TID subfield. In the IEEE 802.11ax protocol draft, when a value of the acknowledgement frame type subfield in the STA information subfield is 1 and a value of the TID subfield is 14, it indicates that all A-MPDU subframes in the A-MPDU are successfully transmitted, and the STA information subfield does not include the block acknowledgement starting sequence control field and the block acknowledgement bitmap field. When a value of the acknowledgement frame type subfield in the STA information subfield is 0 and a value range of the TID subfield is from 0 to 7, it indicates that some A-MPDU subframes in the A-MPDU are successfully transmitted. The STA information subfield includes the block acknowledgement starting sequence control field and the block acknowledgement bitmap field.

In an optional embodiment of this application, regardless of whether all A-MPDU subframes in the A-MPDU are successfully transmitted, or some A-MPDU subframes in the A-MPDU are successfully transmitted and the other A-MPDU subframes are not successfully transmitted, or no A-MPDU subframe in the A-MPDU is successfully transmitted, a value of the acknowledgement frame type subfield is always 0, and a value range of the TID subfield is from 0 to 7, to always indicate that a corresponding STA information subfield includes the block acknowledgement starting sequence control field and the block acknowledgement bitmap field. Based on the maximum quantity of bytes of the block acknowledgement bitmap field that is determined in the session association phase and depending on whether each A-MPDU subframe is successfully received in actual application, the AP adds corresponding bitmap field information to the block acknowledgement bitmap field.

In another optional embodiment of this application, when all the A-MPDU subframes in the A-MPDU are successfully transmitted, or some A-MPDU subframes in the A-MPDU are successfully transmitted and the other A-MPDU subframes are not successfully transmitted, a value of the acknowledgement frame type subfield is 0, and a value range of the TID subfield is from 0 to 7, to always indicate that a corresponding STA information subfield includes the block acknowledgement starting sequence control field and the block acknowledgement bitmap field. Based on the maximum quantity of bytes of the block acknowledgement bitmap field that is determined in the session association phase and depending on whether each A-MPDU subframe is successfully received in actual application, the AP adds corresponding bitmap field information to the block acknowledgement bitmap field. When no A-MPDU subframe in the A-MPDU is successfully transmitted, a value of the AID subfield is a specified AID value, and the specified AID value is different from AID values corresponding to all the STAs associated with the AP. Optionally, a process of generating the block acknowledgement frame by the AP includes: When the entire A-MPDU in any uplink PPDU is not successfully received, the AP sets a value of an AID subfield in a STA information subfield corresponding to the PPDU that is in the block acknowledgement frame and in which the entire A-MPDU is not successfully received to a specified AID value. That the entire A-MPDU in the uplink PPDU is not successfully received means that no A-MPDU subframe in the A-MPDU in the uplink PPDU is successfully transmitted. For example, the specified AID value may be 2045. When allocating an AID to the associated STA, the AP may reserve 2045 and does not allocate 2045.

When no A-MPDU subframe in an A-MPDU in an uplink PPDU is successfully transmitted, a value of the AID subfield is different from AID values corresponding to all the STAs associated with the AP. Therefore, a STA information subfield generated for the uplink PPDU cannot be identified by any STA associated with the AP, so that a STA that sends the uplink PPDU cannot receive corresponding acknowledgement information, and may consider that the uplink PPDU is lost.

It can be learned from the foregoing two optional implementations provided in this embodiment of this application that, in this embodiment of this application, a delay of replying to the STA with the block acknowledgement frame can be reduced without changing a process of parsing the acknowledgement frame by the STA, and compatibility of the method is relatively high.

In step 305, the AP sends the downlink PPDU.

Optionally, the AP sends the downlink PPDU in an orthogonal frequency division multiple access (OFDMA) manner or a multi-user multiple-input multiple-output (MU-MIMO) manner.

It should be noted that a sequence of steps of the method for replying with an acknowledgement frame provided in this embodiment of this application may be properly adjusted, and a step may be correspondingly added or removed based on a situation. Any variation readily figured out by a person skilled in the art within the technical scope disclosed in this application shall fall within the protection scope of this application.

In this embodiment of this application, the AP calculates the sending duration of the PSDU in the to-be-sent downlink PPDU based on the format and the sending rate that are of the downlink PPDU and based on only that the length of each block acknowledgement bitmap field in the block acknowledgement frame in the downlink PPDU is the maximum quantity of bytes that is of each respective block acknowledgement bitmap field of the plurality of STAs and that is determined by the AP and the plurality of STAs in the session association phase. The format and the sending rate of the to-be-sent downlink PPDU are both predetermined by the AP, and the length of each block acknowledgement bitmap field in the block acknowledgement frame in the downlink PPDU is always equal to the maximum quantity of bytes that is of each respective block acknowledgement bitmap field of the plurality of STAs and that is determined by the AP and the plurality of STAs in the session association phase, in other words, the length of each block acknowledgement bitmap field in the block acknowledgement frame is fixed, so that the total length of the block acknowledgement frame is fixed and is unrelated to whether the AP successfully receives the A-MPDU. Therefore, the AP may calculate the sending duration of the PSDU in the downlink PPDU before receiving the A-MPDU, to generate the L-SIG field of the second preamble. In addition, another field in the second preamble may be generated based on the first preamble and the scheduling frame, and is also unrelated to the received A-MPDU. Therefore, the AP may generate the second preamble of the downlink PPDU before receiving the A-MPDU, to reduce a delay of replying to the STA with the block acknowledgement frame.

Figure 7:
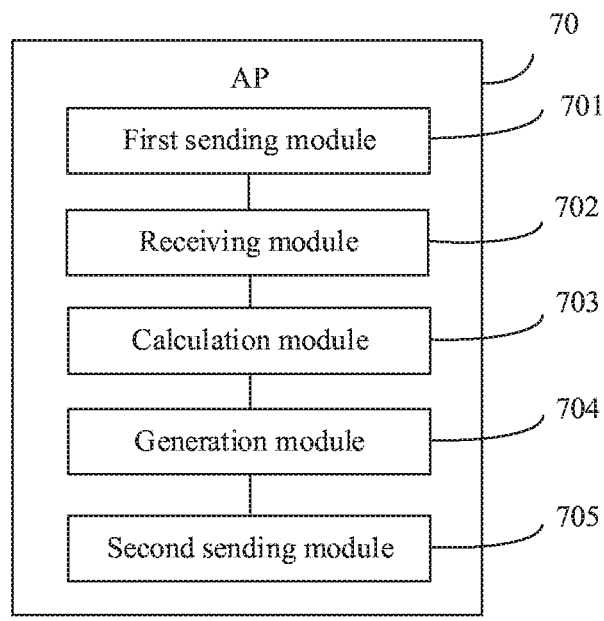
FIG. 7 is a schematic structural diagram of an AP in a WLAN according to an embodiment of this application.

FIG. 7 is a schematic structural diagram of an AP in a WLAN according to an embodiment of this application. As shown in FIG. 7, an AP 70 includes:

a first sending module 701, configured to perform step 301 in the embodiment of FIG. 3;

a receiving module 702, configured to perform step 302 in the embodiment of FIG. 3;

a calculation module 703, configured to perform step 303 in the embodiment of FIG. 3;

a generation module 704, configured to perform step 304 in the embodiment of FIG. 3; and a second sending module 705, configured to perform step 305 in the embodiment of FIG. 3.

Optionally, an L-SIG field includes a length subfield, and the calculation module is configured to: determine a total length of a block acknowledgement frame based on a length of an AID TID field, a length of a block acknowledgement starting sequence control field, a maximum quantity of bytes of a block acknowledgement bitmap field that is determined by the AP and a plurality of STAs in a session association phase, and a total length of all other fields in the block acknowledgement frame, where the length of the AID TID field is two octets, the length of the block acknowledgement starting sequence control field is two octets, and the total length of all the other fields in the block acknowledgement frame is equal to 22 octets; and determine a value of the length subfield based on the total length of the block acknowledgement frame and a sending rate.

Optionally, the AID TID field includes an AID subfield, an acknowledgement frame type subfield, and a TID subfield; and a value of the acknowledgement frame type subfield is always 0, and a value range of the TID subfield is from 0 to 7.

Optionally, the AID TID field includes the AID subfield, the acknowledgement frame type subfield, and the TID subfield, and the generation module is configured to: when the entire A-MPDU in any uplink PPDU is not successfully received, set a value of the AID subfield in a STA information subfield corresponding to the PPDU that is in the block acknowledgement frame and in which the entire A-MPDU is not successfully received to a specified AID value. The specified AID value is different from AID values corresponding to all STAs associated with the AP.

Optionally, the maximum quantity of bytes of the block acknowledgement bitmap field is one of 4 bytes, 8 bytes, 16 bytes, and 32 bytes.

In this embodiment of this application, the AP calculates sending duration of a PSDU in a to-be-sent downlink PPDU based on a format and a sending rate that are of the downlink PPDU and based on only that a length of each block acknowledgement bitmap field in the block acknowledgement frame in the downlink PPDU is a maximum quantity of bytes that is of each respective block acknowledgement bitmap field of the plurality of STAs and that is determined by the AP and the plurality of STAs in the session association phase. The format and the sending rate of the to-be-sent downlink PPDU are both predetermined by the AP, and the length of each block acknowledgement bitmap field in the block acknowledgement frame in the downlink PPDU is always equal to the maximum quantity of bytes that is of each respective block acknowledgement bitmap field of the plurality of STAs and that is determined by the AP and the plurality of STAs in the session association phase, in other words, the length of each block acknowledgement bitmap field in the block acknowledgement frame is fixed, so that the total length of the block acknowledgement frame is fixed and is unrelated to whether the AP successfully receives the A-MPDU. Therefore, the AP may calculate the sending duration of the PSDU in the downlink PPDU before receiving the A-MPDU, to generate the L-SIG field of a second preamble. In addition, another field in the second preamble may be generated based on a first preamble and a scheduling frame, and is also unrelated to the received A-MPDU. Therefore, the AP may generate the second preamble of the downlink PPDU before receiving the A-MPDU, to reduce a delay of replying to the STA with the block acknowledgement frame.

When the AP in the WLAN provided in the foregoing embodiment replies with the acknowledgement frame, division of the foregoing functional modules is only used as an example for description. During actual application, the foregoing functions may be allocated to different functional modules for implementation according to a requirement. That is, an internal structure of the device is divided into different functional modules to implement all or some of the functions described above. In addition, the AP in the WLAN provided in the foregoing embodiment and the embodiment of the method for replying with an acknowledgement frame belong to a same concept. For a specific implementation process of the AP, refer to the method embodiment, and details are not described herein again.

Figure 8:
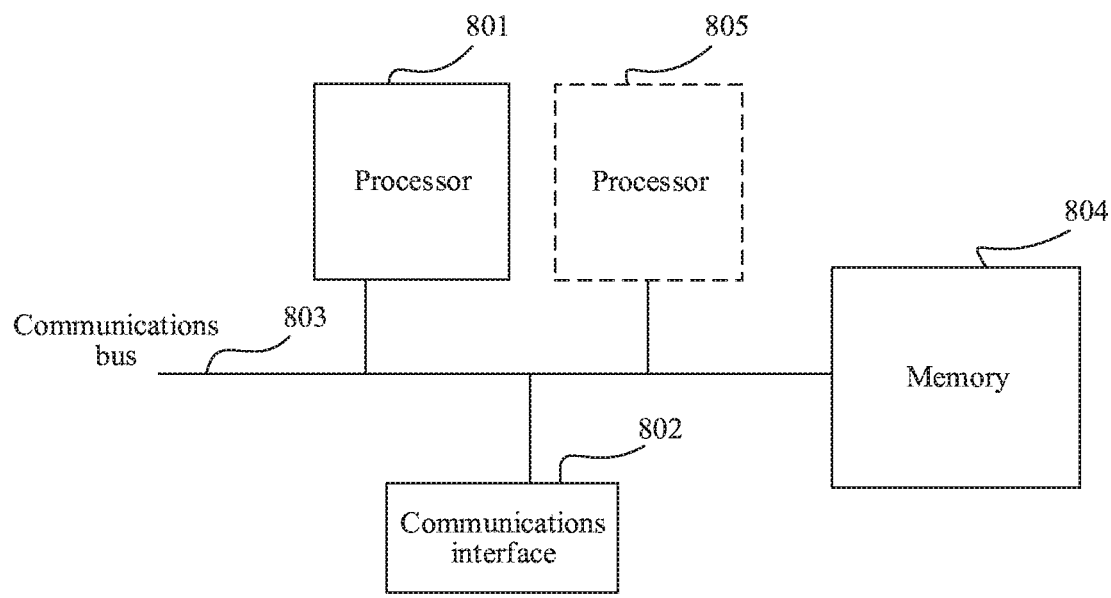
FIG. 8 is a schematic structural diagram of an AP according to an embodiment of this application.

FIG. 8 is a schematic structural diagram of an AP according to an embodiment of this application. Referring to FIG. 8, the AP includes at least one processor 801 and at least one communications interface 802.

Optionally, as shown in FIG. 8, the AP further includes a communications bus 803 and a memory 804.

The processor 801 may be a central processing unit (CPU), an application-specific integrated circuit (ASIC), or one or more integrated circuits configured to control program execution of solutions of this application.

In specific implementation, in an embodiment, the AP may include a plurality of processors such as the processor 801 and a processor 805 shown in FIG. 8. Each of these processors may be a single-core processor, or may be a multi-core processor. The processor herein may be one or more devices, circuits, and/or processing cores configured to process data (for example, a computer program instruction).

The communications interface 802 is configured to communicate with another device or communications network by using any apparatus such as a transceiver. The communications network is, for example, a wireless local area network (WLAN). The processor 801 exchanges information with another network device such as a STA by using the communications interface 802.

The communications bus 803 may include a path for transmitting information between the foregoing components.

The memory 804 may be a read-only memory (ROM) or another type of static storage device that can store static information and instructions, or a random access memory (RAM) or another type of dynamic storage device that can store information and instructions, or may be an electrically erasable programmable read-only memory (EEPROM), an optical disk or another optical storage, a magnetic disk storage medium or another magnetic storage device, or any other media that can be accessed by a computer and that can be configured to carry or store expected program code having an instruction or data structure form. However, this is not limited thereto. The memory 804 may exist independently, and is connected to the processor 801 by using the communications bus 803. Alternatively, the memory 804 may be integrated with the processor 801.

When the processor is the CPU, the memory 804 is configured to store program code used to perform the solutions of this application, and the processor 801 controls execution of the program code. The processor 801 is configured to execute the program code stored in the memory 804. The program code may include one or more software modules.

The computer device may be a general-purpose computer device or a dedicated computer device. In specific implementation, the computer device may be a desktop, a portable computer, a network server, a personal digital assistant (PDA), a mobile phone, a tablet computer, a wireless terminal device, a communications device, or an embedded device. A type of the computer device is not limited in this embodiment of this application.

All or some of the foregoing embodiments may be implemented by software, hardware, or a combination thereof. When software is used to implement the embodiments, the embodiments may be implemented completely or partially in a form of a computer program product. The computer program product includes one or more computer instructions. When the computer instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, a twisted pair) or wireless (for example, infrared, wireless, or microwave) manner. The computer-readable storage medium may be any medium accessible by a computer, or a data storage device, such as a server or a data center, integrating one or more usable media. The medium may be a magnetic medium (for example, a floppy disk, a hard disk, or a magnetic tape), an optical medium, a semiconductor medium (for example, a solid state disk (SSD)), or the like.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the conception and principle of this application should fall within the protection scope of this application.

What is claimed is:

1. A method for replying with an acknowledgement frame, wherein the method comprises:
sending, by an access point (AP) in a wireless local area network (WLAN), a scheduling frame to a plurality of stations (STAs) associated with the AP in the WLAN;
receiving, by the AP, a plurality of uplink physical layer protocol data units (PPDUs) that are in response to the scheduling frame, wherein each of the plurality of uplink PPDUs comprises a first preamble and an aggregate media access control protocol data unit (A-MPDU), each A-MPDU comprises at least one A-MPDU subfield;
calculating, by the AP, sending duration of a physical layer service data unit (PSDU) in a to-be-sent downlink PPDU based on a format and a sending rate that are of the downlink PPDU and based on that a length of each block acknowledgement bitmap field in a block acknowledgement frame in the downlink PPDU is a maximum quantity of bytes that is of each respective block acknowledgement bitmap field of the plurality of STAs and that is determined by the AP and the plurality of STAs in a session association phase, to generate a legacy signal (L-SIG) field of a second preamble, wherein the downlink PPDU comprises the second preamble and the PSDU, and the PSDU is the block acknowledgement frame for A-MPDUs in all the uplink PPDUs;

generating, by the AP, the block acknowledgement frame, wherein the block acknowledgement frame comprises a block acknowledgement information field, the block acknowledgement information field comprises a plurality of STA information subfields, the plurality of STA information subfields have a one-to-one correspondence with the plurality of STAs, and regardless of whether all A-MPDU subfields in each of the A-MPDUs in all the uplink PPDUs are received, each STA information subfield comprises an association identifier traffic identifier (AID TID) field, a block acknowledgement starting sequence control field, and a block acknowledgement bitmap field, the AID TID field comprises an acknowledgement frame type subfield, a value of the acknowledgement frame type subfield is always 0, and a length of the block acknowledgement bitmap field in each STA information subfield is equal to a maximum quantity of bytes of a block acknowledgement bitmap field that is determined by the AP and a corresponding STA in the session association phase; and sending, by the AP, the downlink PPDU.

2. The method according to claim 1, wherein the L-SIG field comprises a length subfield, and the calculating sending duration of a physical layer service data unit (PSDU) in a downlink PPDU, to generate an L-SIG field of a second preamble comprises:

determining, by the AP, a total length of the block acknowledgement frame based on a length of the AID TID field, a length of the block acknowledgement starting sequence control field, the maximum quantity of bytes of the block acknowledgement bitmap field that is determined by the AP and the plurality of STAs in the session association phase, and a total length of all other fields in the block acknowledgement frame, wherein the length of the AID TID field is two octets, the length of the block acknowledgement starting sequence control field is two octets, and the total length of all the other fields in the block acknowledgement frame is equal to 22 octets; and determining, by the AP, a value of the length subfield based on the total length of the block acknowledgement frame and the sending rate.

3. The method according to claim 1, wherein the AID TID field further comprises an AID subfield, and a TID subfield; and a value range of the TID subfield is from 0 to 7.

4. The method according to claim 1, wherein the AID TID field further comprises an AID subfield, and a TID subfield, and the generating, by the AP, the block acknowledgement frame comprises:

when the entire A-MPDU in any uplink PPDU is not successfully received, setting, by the AP, a value of an AID subfield in a STA information subfield corresponding to the PPDU that is in the block acknowledgement frame and in which the entire A-MPDU is not successfully received to a specified AID value, wherein the specified AID value is different from AID values corresponding to all the STAs associated with the AP.

5. The method according to claim 1, wherein the maximum quantity of bytes of the block acknowledgement bitmap field is one of 4 bytes, 8 bytes, 16 bytes, and 32 bytes.

6. The method according to claim 1, wherein said calculating is based on that the length of each block acknowledgement bitmap field in the block acknowledgement frame in the downlink PPDU is always fixed and is unrelated to whether the AP successfully receives the A-MPDU in the uplink PPDU.

7. An access point (AP) in a wireless local area network (WLAN), wherein the AP comprises a processor and a communications interface, wherein the processor is configured to perform operations including:

sending a scheduling frame to a plurality of stations (STAs) associated with the AP in the WLAN;

receiving a plurality of uplink physical layer protocol data units (PPDUs) that are in response to the scheduling frame, wherein each of the plurality of uplink PPDUs comprises a first preamble and an aggregate media access control protocol data unit (A-MPDU), each A-MPDU comprises at least one A-MPDU subfield;

calculating sending duration of a physical layer service data unit (PSDU) in a to-be-sent downlink PPDU based on a format and a sending rate that are of the downlink PPDU and based on that a length of each block acknowledgement bitmap field in a block acknowledgement frame in the downlink PPDU is a maximum quantity of bytes that is of each respective block acknowledgement bitmap field of the plurality of STAs and that is determined by the AP and the plurality of STAs in a session association phase, to generate a legacy signal (L-SIG) field of a second preamble, wherein the downlink PPDU comprises the second preamble and the PSDU, and the PSDU is the block acknowledgement frame for A-MPDUs in all the uplink PPDUs;

generating the block acknowledgement frame, wherein the block acknowledgement frame comprises a block acknowledgement information field, the block acknowledgement information field comprises a plurality of STA information subfields, the plurality of STA information subfields have a one-to-one correspondence with the plurality of STAs, and regardless of whether all A-MPDU subfields in each of the A-MPDUs in all the uplink PPDUs are received, each STA information subfield comprises an association identifier traffic identifier (AID TID) field, a block acknowledgement starting sequence control field, and a block acknowledgement bitmap field, the AID TID field comprises an acknowledgement frame type subfield, a value of the acknowledgement frame type subfield is always 0, and a length of the block acknowledgement bitmap field in each STA information subfield is equal to a maximum quantity of bytes of a block acknowledgement bitmap field that is determined by the AP and a corresponding STA in the session association phase; and sending the downlink PPDU; and the processor is further configured to exchange information with an associated STA by using the communications interface.

8. The AP according to claim 7, wherein herein the L-SIG field comprises a length subfield, and the calculating sending duration of a physical layer service data unit PSDU in a downlink PPDU, to generate an L-SIG field of a second preamble comprises:

determining, by the AP, a total length of the block acknowledgement frame based on a length of the AID TID field, a length of the block acknowledgement starting sequence control field, the maximum quantity of bytes of the block acknowledgement bitmap field that is determined by the AP and the plurality of STAs in the session association phase, and a total length of all other fields in the block acknowledgement frame, wherein the length of the AID TID field is two octets, the length of the block acknowledgement starting sequence control field is two octets, and the total length of all the other fields in the block acknowledgement frame is equal to 22 octets; and determining, by the AP, a value of the length subfield based on the total length of the block acknowledgement frame and the sending rate.

9. The AP according to claim 7, wherein the AID TID field comprises an AID subfield, and a TID subfield; and a value range of the TID subfield is from 0 to 7.

10. The AP according to claim 7, wherein the AID TID field further comprises an AID subfield, and a TID subfield, and the generating, by the AP, the block acknowledgement frame comprises:

when the entire A-MPDU in any uplink PPDU is not successfully received, setting, by the AP, a value of an AID subfield in a STA information subfield corresponding to the PPDU that is in the block acknowledgement frame and in which the entire A-MPDU is not successfully received to a specified AID value, wherein the specified AID value is different from AID values corresponding to all the STAs associated with the AP.

11. The AP according to claim 7, the maximum quantity of bytes of the block acknowledgement bitmap field is one of 4 bytes, 8 bytes, 16 bytes, and 32 bytes.

12. The AP according to claim 7, wherein the processor is configured to perform said calculating based on that the length of each block acknowledgement bitmap field in the block acknowledgement frame in the downlink PPDU is always fixed and is unrelated to whether the AP successfully receives the A-MPDU in the uplink PPDU.

13. A data transmission system, wherein the data transmission system comprises an access point (AP) and a plurality of stations (STAs) associated with the AP, wherein the AP in a wireless local area network (WLAN) comprises a processor and a communications interface, wherein the processor is configured to perform operations including:

sending a scheduling frame to a plurality of STAs associated with the AP in the WLAN;

receiving a plurality of uplink physical layer protocol data units (PPDUs) that are in response to the scheduling frame, wherein each of the plurality of uplink PPDUs comprises a first preamble and an aggregate media access control protocol data unit (A-MPDU), each A-MPDU comprises at least one A-MPDU subfield, calculating sending duration of a physical layer service data unit (PSDU) in a to-be-sent downlink PPDU based on a format and a sending rate that are of the downlink PPDU and based on that a length of each block acknowledgement bitmap field in a block acknowledgement frame in the downlink PPDU is a maximum quantity of bytes that is of each respective block acknowledgement bitmap field of the plurality of STAs and that is determined by the AP and the plurality of STAs in a session association phase, to generate a legacy signal (L-SIG) field of a second preamble, wherein the downlink PPDU comprises the second preamble and the PSDU, and the PSDU is the block acknowledgement frame for A-MPDUs in all the uplink PPDUs;

generating the block acknowledgement frame, wherein the block acknowledgement frame comprises a block acknowledgement information field, the block acknowledgement information field comprises a plurality of STA information subfields, the plurality of STA information subfields have a one-to-one correspondence with the plurality of STAs, and regardless of whether all A-MPDU subfields in each of the A-MPDUs in all the uplink PPDUs are received, each STA information subfield comprises an association identifier traffic identifier (AID TID) field, a block acknowledgement starting sequence control field, and a block acknowledgement bitmap field, the AID TID field comprises an acknowledgement frame type subfield, a value of the acknowledgement frame type subfield is always 0, and a length of the block acknowledgement bitmap field in each STA information subfield is equal to a maximum quantity of bytes of a block acknowledgement bitmap field that is determined by the AP and a corresponding STA in the session association phase; and sending the downlink PPDU; and the processor is further configured to exchange information with an associated STA by using the communications interface.

14. The data transmission system according to claim 13, wherein herein the L-SIG field comprises a length subfield, and the calculating sending duration of a physical layer service data unit PSDU in a downlink PPDU, to generate an L-SIG field of a second preamble comprises:

determining, by the AP, a total length of the block acknowledgement frame based on a length of the AID TID field, a length of the block acknowledgement starting sequence control field, the maximum quantity of bytes of the block acknowledgement bitmap field that is determined by the AP and the plurality of STAs in the session association phase, and a total length of all other fields in the block acknowledgement frame, wherein the length of the AID TID field is two octets, the length of the block acknowledgement starting sequence control field is two octets, and the total length of all the other fields in the block acknowledgement frame is equal to 22 octets; and determining, by the AP, a value of the length subfield based on the total length of the block acknowledgement frame and the sending rate.

15. The data transmission system according to claim 13, wherein the AID TID field further comprises an AID subfield, and a TID subfield; and a value range of the TID subfield is from 0 to 7.

16. The data transmission system according to claim 13, wherein the AID TID field further comprises an AID subfield, a TID subfield, and the generating, by the AP, the block acknowledgement frame comprises:

when the entire A-MPDU in any uplink PPDU is not successfully received, setting, by the AP, a value of an AID subfield in a STA information subfield corresponding to the PPDU that is in the block acknowledgement frame and in which the entire A-MPDU is not successfully received to a specified AID value, wherein the specified AID value is different from AID values corresponding to all the STAs associated with the AP.

17. The data transmission system according to claim 13, the maximum quantity of bytes of the block acknowledgement bitmap field is one of 4 bytes, 8 bytes, 16 bytes, and 32 bytes.

18. The data transmission system according to claim 13, wherein said calculating is based on that the length of each block acknowledgement bitmap field in the block acknowledgement frame in the downlink PPDU is always fixed and is unrelated to whether the AP successfully receives the A-MPDU in the uplink PPDU.

* * * * *